United States Patent
Oh et al.

(10) Patent No.: US 10,049,629 B2
(45) Date of Patent: Aug. 14, 2018

(54) DISPLAY DEVICE CAPABLE OF LOW-SPEED DRIVING AND METHOD OF DRIVING THE SAME

(71) Applicant: LG Display Co., Ltd., Seoul (KR)

(72) Inventors: Daeseok Oh, Gyeonggi-do (KR); Moonsoo Chung, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 118 days.

(21) Appl. No.: 14/983,772

(22) Filed: Dec. 30, 2015

(65) Prior Publication Data

US 2016/0322012 A1    Nov. 3, 2016

(30) Foreign Application Priority Data

Apr. 29, 2015 (KR) .................. 10-2015-0060839

(51) Int. Cl.
  G06F 3/038    (2013.01)
  G09G 5/00     (2006.01)
  G09G 3/36     (2006.01)

(52) U.S. Cl.
  CPC .......... *G09G 3/3648* (2013.01); *G06F 3/038* (2013.01); *G09G 5/00* (2013.01); *G09G 2310/0224* (2013.01); *G09G 2340/0435* (2013.01)

(58) Field of Classification Search
  None
  See application file for complete search history.

(56) References Cited

U.S. PATENT DOCUMENTS

| | | | | |
|---|---|---|---|---|
| 2010/0086282 A1* | 4/2010 | Takahashi | ............ | H04N 7/0112 386/241 |
| 2013/0057791 A1* | 3/2013 | Kitayama | .............. | G09G 3/003 349/15 |
| 2014/0085276 A1* | 3/2014 | Jang | ..................... | G09G 3/2007 345/204 |
| 2015/0103104 A1* | 4/2015 | Lee | ...................... | G09G 3/3648 345/690 |
| 2015/0187334 A1 | 7/2015 | Oh et al. | | |

OTHER PUBLICATIONS

U.K. Office Action dated Jun. 13, 2016 for the corresponding application No. GB 1522498.3.

* cited by examiner

*Primary Examiner* — Stephen T Reed
(74) *Attorney, Agent, or Firm* — Morgan, Lewis & Bockius LLP

(57) ABSTRACT

A disclosed display device includes a display panel with a plurality of pixels and a plurality of signal lines respectively connected to the pixels, and a panel driving circuit to drive the signal lines. The display device further includes a timing controller to receive a first panel self-refresh (PSR) signal and an input image data from a host system, to sense whether the input image data has a preset video format based on the first PSR signal and, if the input image data is sensed to have the preset video format, to control the panel driving circuit to perform normal driving of the signal lines at a first frame frequency in a first group of frames and interlaced low-speed driving of the signal lines at a second frame frequency lower than the first frame frequency in a second group of frames to display the input image data.

20 Claims, 6 Drawing Sheets

DISPLAY DEVICE CAPABLE OF LOW-SPEED DRIVING AND METHOD OF DRIVING THE SAME

The application claims the benefit of Korean Patent Application No. 10-2015-0060839, filed on Apr. 29, 2015, which is hereby incorporated by reference.

BACKGROUND OF THE INVENTION

Field of the Invention

The present invention relates to a display device and, more particularly, to a display device capable of low-speed driving and a method of driving the same.

Discussion of the Related Art

Display devices are used in a variety of display products, such as portable information devices, office appliances, computers, and televisions. The PSR (Panel Self Refresh) technology is known to reduce power consumption in display devices. The PSR was suggested to improve system power saving performance. It minimizes power consumption using a frame memory incorporated in a display module. When a PSR feature is activated, the system stores a still image data in the display module's frame memory. The system's operating power is cut off until a new still image data is input. With the power cut off, the data stored in the frame memory is repeatedly displayed. As such, power consumption is reduced without the user recognizing it.

The PSR technology was originally suggested for still images, but there have been recent attempts to extend the application of this technology to moving video images. An example of such attempts is the PSR-based 24 FPS (Frame Per Second) image display technology.

For video images, FPS (Frame Per Second) indicates the amount of image data transmitted from the host system to the display module for 1 second. FPS is distinguished from frame frequency, which is the rate at which the screen on the display module refreshes. FPS and frame frequency may vary. For example, as shown in FIG. 1, a 24 FPS video consisting of 24 different frames may be displayed on the display module running at a frame frequency of 60 Hz. In this case, 24 fps images are displayed through 60 frames in such a manner that the first fps image is repeated in the first to the third frames, and the second fps image is repeated in the fourth and the fifth frames. The system's operating power is cut off in 36 of the 60 frames, not including the 24 frames in which the 24 fps images are respectively transmitted to the display module.

The PSR technology can work with a low-speed driving technique that is implemented through interlaced driving. Interlaced low-speed driving can reduce the output frame frequency to one half or less of the input frame frequency by increasing the refresh cycle of the image data to at least two frames. FIG. 2 shows an example of interlaced low-speed driving, in which some gate lines, e.g., G1, G2, G5, and G6, are driven (odd scanning of FIG. 2) in odd frames and the other gate lines, e.g., G3, G4, G7, and G8, are driven (even scanning of FIG. 2) in even frames. As a result, in this example, an image data input in synchronization with an input frame frequency of 60 Hz is displayed at an output frame frequency of 30 Hz.

However, in the event that interlaced low-speed driving is performed for video images synchronized with the PSR, display distortion caused by data inconsistency may result in particular frames in which an image data different from that of the preceding frame is written. For example, if image data A to be written in the third frame is different from image data B to be written in the fourth frame as shown in FIG. 2, the displayed image made up partly from the image data A and partly from the image data B becomes distorted in the fourth frame.

Due to this display distortion, the related art devices are not capable of implementing interlaced low frequency driving with respect to video image data synchronized with the PSR. Instead, they implement only normal driving (at the output frame frequency of 60 Hz, which is the same as the input frame frequency) as shown in FIG. 1. As a result, there is a limitation in the related art with respect to reducing power consumption.

SUMMARY

Accordingly, the present invention is directed to a display device capable of low-speed driving and a method of driving the same that substantially obviate one or more of the problems due to limitations and disadvantages of the related art.

An object of the present invention is to provide a display device which prevents or mitigates display distortion and reduces power consumption by utilizing both normal driving and interlaced low-speed driving for video data synchronized with the PSR.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device comprises: a display panel with a plurality of pixels and a plurality of signal lines respectively connected to the pixels; a panel driving circuit configured to drive the signal lines; and a timing controller configured to receive a first panel self-refresh (PSR) signal and an input image data from a host system, to sense whether the input image data has a preset video format based on the first PSR signal and, if the input image data is sensed to have the preset video format, to control the panel driving circuit to perform normal driving of the signal lines at a first frame frequency in a first group of frames and interlaced low-speed driving of the signal lines at a second frame frequency in a second group of frames to display the input image data, wherein the second frame frequency is lower than the first frame frequency.

In another aspect, a method of driving a display device comprising a display panel with a plurality of pixels and a plurality of signal lines respectively connected to the pixels, and a panel driving circuit configured to drive the signal lines is disclosed. The method comprises: receiving a first panel self-refresh (PSR) signal and an input image data from a host system; sensing whether the input image data has a preset video format based on the first PSR signal; and if the input image data is sensed to have the preset video format, controlling the panel driving circuit to perform normal driving of the signal lines at a first frame frequency in a first group of frames and interlace low-speed driving of the signal lines at a second frame frequency in a second group of frames to display the input image data, wherein the second frame frequency is lower than the first frame frequency.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate example embodiments of the invention and together with the description serve to explain the principles of the invention. In the drawings.

DETAILED DESCRIPTION OF EXAMPLE EMBODIMENTS

Reference will now be made in detail to the embodiments of the present invention, examples of which are illustrated in the accompanying drawings. An example embodiment of the present invention will be described with reference to FIGS. 3 to 9 and 10A to 10E.

Figures 1, 2:
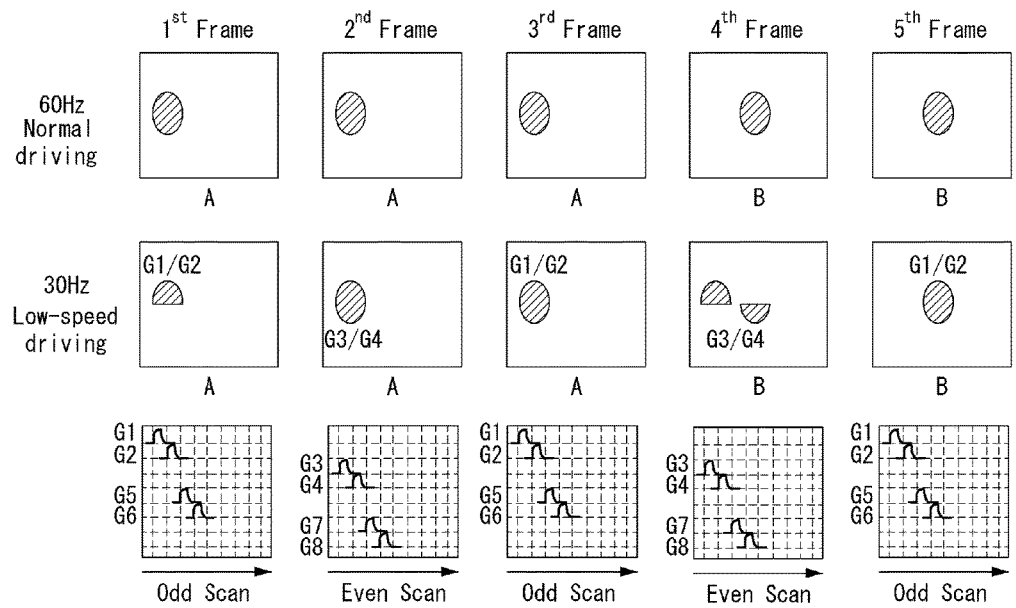
FIG. 1 is a view showing an example of driving for displaying a 24 FPS video on a display module running at a frame frequency of 60 Hz according to the related art.
FIG. 2 is a view showing an example of display distortion occurring when video data synchronized with the PSR is displayed by interlaced low-speed driving according to the related art.
Figure 3:
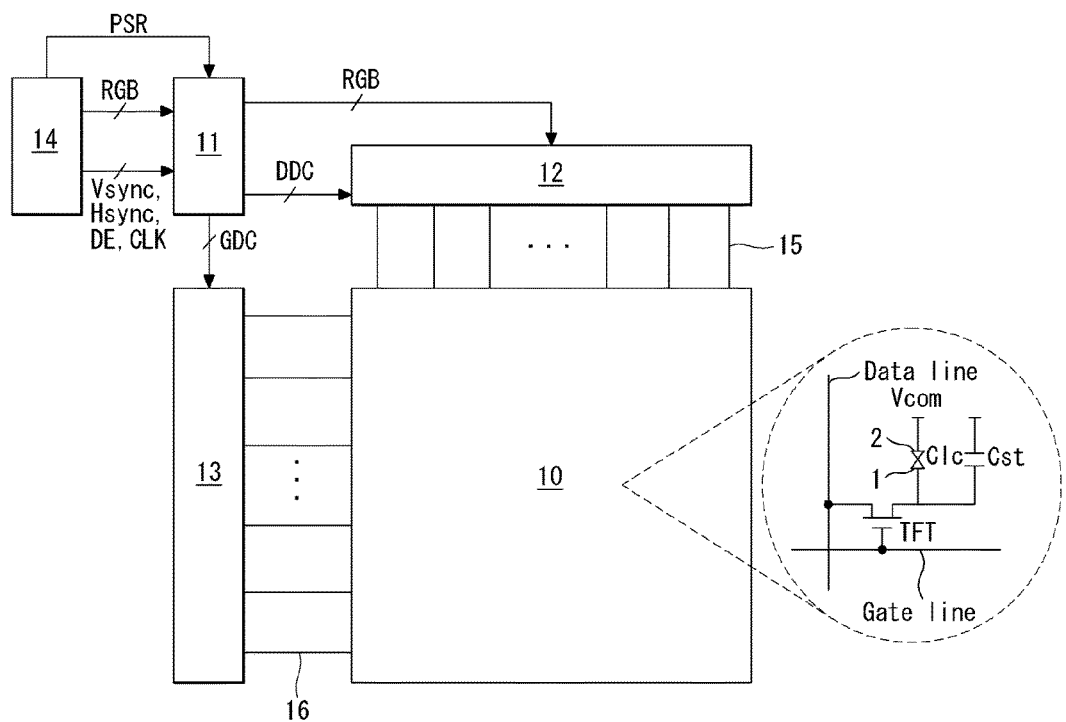
FIG. 3 is a block diagram showing a display device capable of low-speed driving according to an example embodiment of the present invention.
Figure 4:
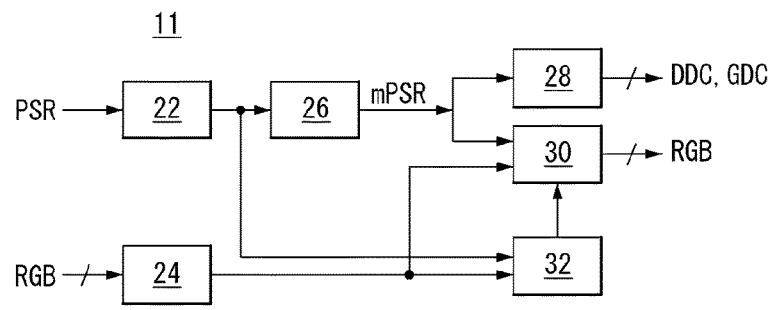
FIG. 4 shows an example internal configuration of the timing controller of FIG. 3.

FIG. 3 is a block diagram showing a display device according to an example embodiment of the present invention. FIG. 4 shows an example internal configuration of the timing controller of FIG. 3.

As shown in FIG. 3, a display device according to the present invention may be implemented as a flat panel display, such as a liquid crystal display (LCD), a field emission display (FED), a plasma display panel (PDP), an organic light emitting display (OLED), or an electrophoresis display (EPD). Although the following example embodiment will be described with respect to a liquid crystal display as an example of the flat plane display, it is to be noted that the display device according to the present invention is not limited to the liquid crystal display and may be implemented as other types of flat panel displays.

A display device according to an example embodiment of the present invention may comprise a display panel 10, a timing controller 11, a source driver 12, a gate driver 13, and a host system 14. The source driver 12 and the gate driver 13 constitute a panel driving circuit.

The display panel 10 may comprise a liquid crystal layer formed between two substrates. The substrates may be made of glass or other materials known for use in display substrates. A pixel array may be formed on a lower substrate of the display panel 10. The pixel array may comprise liquid crystal cells Clc (pixels) formed at the crossings of data lines 15 and gate lines 16, thin film transistors (TFTs) connected to pixel electrodes 1 of the pixels, a common electrode 2 facing the pixel electrodes 1, and storage capacitors Cst. Each liquid crystal cell Clc may be connected to a TFT and be driven by an electric field between the pixel electrode 1 and the common electrode 2. A black matrix, red (R), green (G), and blue (B) color filters, and other layers may be formed on an upper substrate of the display panel 10. Polarizers may be respectively attached to the upper and lower substrates of the display panel 10, and an alignment film for setting a pre-tilt angle of liquid crystals may be disposed on them.

The common electrode 2 may be formed on the upper substrate in a device implementing a vertical electric field driving mode, such as the Twisted Nematic (TN) mode or the Vertical Alignment (VA) mode, and on the lower substrate together with the pixel electrodes 1 in a device implementing a horizontal electric field driving mode, such as the In-Plane Switching (IPS) mode or the Fringe Field Switching (FFS) mode.

The display panel 10 according to the example embodiment of the present invention may be implemented with any well-known liquid crystal driving modes, such as the TN (Twisted Nematic) mode, the VA (Vertical Alignment) mode, the IPS (In-Plane Switching) mode, and the FFS (Fringe Field Switching) mode. Further, the liquid crystal display according to the example embodiment of the present invention may be implemented as any form of a liquid crystal display device, including a transmissive liquid crystal display, a semi-transmissive liquid crystal display, and a reflective liquid crystal display. The transmissive liquid crystal display and the semi-transmissive liquid crystal display require a backlight unit. The backlight unit may be implemented as a direct-type backlight unit or an edge-type backlight unit.

The timing controller 11 may receive digital video data RGB of an input image from the host system 14 through an LVDS (Low Voltage Differential Signaling) interface, and supply the digital video data RGB of this input image to the source driver 12 through a mini-LVDS interface. The timing controller 11 may align the digital video data RGB input from the host system 14 according to the layout and configuration of the pixel array and then supply the digital video data to the source driver 12.

The timing controller 11 may also receive timing signals, such as a vertical synchronization signal Vsync, a horizontal synchronization signal Hsync, a data enable signal DE, and a dot clock CLK, from the host system 14 and generate control signals for controlling the operation timings of the source driver 12 and gate driver 13. The control signals may include gate timing control signals GDC for controlling the operation timing of the gate driver 13 and source timing control signals DDC for controlling the operation timing of the source driver 12.

The gate timing control signals GDC may include such signals as a gate start pulse GSP, a gate shift clock GSC, and a gate output enable signal GOE. The gate start pulse GSP may be applied to a gate drive integrated circuit (IC) that generates a first scan pulse, and may control the gate drive IC so that it generates the first scan pulse. The gate shift clock GSC is a clock signal that may be input to each of the gate drive ICs and shift the gate start pulse GSP. The gate output enable signal GOE controls the output from the gate drive ICs.

The source timing control signals may include such signals as a source start pulse SSP, a source sampling clock SSC, a polarity control signal POL, and a source output enable signal SOE. The source start pulse SSP controls the data sampling start timing of the source driver 12. The source sampling clock SSC is a clock signal that controls the sampling timing of data in the source driver 12 based on its rising or falling edge. The polarity control signal POL controls the polarities of data voltages sequentially output from output channels of the source driver 12. The source output enable signal SOE controls the output timing of the source driver 12.

The timing controller 11 may sense a preset video input format based on a first panel self-refresh signal (hereinafter, the first PSR signal) PSR applied from the host system 14. If the preset video format is sensed, the timing controller 11 may control the operation of the source and gate drivers 12 and 13 at a first frame frequency (e.g., 60 Hz) for normal driving in some of the frames (e.g., a first group of frames) for displaying the input video image and at a second frame frequency (e.g., 30 Hz) lower than the first frame frequency for interlaced low-speed driving in other frames (e.g., a second group of frames different from the first group) for displaying the input video image. As described in more detail below, in some cases, the timing controller 11 may control the source and gate drivers 12 and 13 to stop driving the data lines and gate lines in yet other frames (e.g., a third group of frames different from the first and the second groups). If the preset video format is not sensed, the timing controller 11 may control the operation of the source and gate drivers 12 and 13 at the first frame frequency (e.g., 60 Hz) for normal driving without performing interlaced low-speed driving.

To this end, as shown in FIG. 4, the timing controller 11 may comprise an FPS sensing circuit 22, a data receiving circuit 24, a PSR modulation circuit 26, a control signal generation circuit 28, a data output circuit 30, and a frame memory 32.

The FPS sensing circuit 22 analyzes the first PSR signal PSR from the host system 14 and senses whether a preset video format is input from the host system 14. The preset video format may comprise, for example, a 48 FPS image data shown in FIG. 10A, a 72 FPS image data shown in FIG. 10B, a 96 FPS image data shown in FIG. 10C, a 120 FPS image data shown in FIG. 10D, or a 144 FPS image data shown in FIG. 10E. The embodiments of the present invention are not limited to these specific FPS image data and may incorporate image data having a different FPS. The first PSR signal PSR may be generated as a pulse waveform with a certain period, and its shape may vary depending on the format of the preset FPS image data, as shown in FIGS. 10A to 10E. The low logic period ("L" in FIG. 5) of the first PSR signal PSR may indicate a period in which the FPS image data is input from the host system 14, and the high logic period ("H" in FIG. 5) of the first PSR signal PSR may indicate a period in which the operating power of the host system 14 is cut off. The FPS sensing circuit 22 may include any known digital counter to count the number of changes in the logic level of the first PSR signal PSR and compare the count value with a preset reference value to sense whether a preset FPS image data format is input. If the FPS sensing circuit 22 senses that the preset data format is not input, normal driving is performed. If the FPS sensing circuit 22 senses that the preset data format is input, a combination of normal driving and interlaced low-speed driving may be performed as described below in more detail.

The data receiver 24 may supply the FPS image data input from the host system 14 to the data output circuit 30 and the frame memory 32 during the low logic period ("L" in FIG. 5) of the first PSR signal PSR.

The PSR modulation circuit 26 modulates the first PSR signal PSR to generate a second PSR signal mPSR. The second PSR signal mPSR may be generated as a pulse waveform with a certain period, and its shape may vary depending on the type of the preset FPS image, as shown in FIGS. 10A to 10E. The low logic period of the second PSR signal mPSR indicates a period in which the FPS image is displayed according to normal driving (e.g., at 60 Hz in FIG. 5), and the high logic period of the second PSR signal mPSR indicates a period in which the FPS image is displayed according to interlaced low-speed driving (e.g., at 30 Hz in FIG. 5).

The control signal generation circuit 28 may select a first driving mode for the normal driving mode or a second driving mode for the interlaced low-speed driving mode, based on the second PSR signal mPSR. Also, the control signal generation circuit 28 may generate timing control signals GDC and DDC according to the selected driving mode.

In the interlaced low-speed driving mode, the control signal generation circuit 28 may shorten the scan period (e.g., P1 in FIG. 8) for the gate lines by controlling the operation of the gate driver 13, and cut off data output by controlling the operation of the source driver 12 during the skip period (e.g., P2 in FIG. 8), which is the period outside the scan period (e.g., P1 in FIG. 8) within a given frame. Also, in the interlaced low-speed driving mode, the control signal generation circuit 28 may eliminate a static current flowing through the output buffers of the source driver 12 by cutting off the operating power applied to the output buffers of the source driver 12 during the skip period (e.g., P2 in FIG. 8) of the corresponding frame, thereby significantly reducing the power consumption in the source driver 12.

The frame memory 32 may store the FPS image data during the low logic period ("L" in FIG. 5) of the first PSR signal PSR in response to the first PSR signal PSR, and apply it to the data output circuit 30 during the high logic period ("H" in FIG. 5) of the first PSR signal PSR. The data output circuit 30 aligns the FPS image data according to either the normal driving mode or the interlaced low-speed driving mode based on the second PSR signal mPSR, and then outputs the aligned FPS image data to the source driver 12.

The source driver 12 may comprise such components as a shift register, a latch array, a digital-to-analog converter, and an output circuit. The source driver 12 may perform normal driving or interlaced low-speed driving based on one or more of the source timing control signals DDC.

The source driver 12 may latch the digital video data RGB of an input image from the timing controller 11 and convert the latched data into analog positive/negative gamma compensation voltages. The source driver 12 then may supply data voltages, the polarities of which are inverted at a predetermined cycle, to the data lines 15 through a plurality of output channels. The output circuit of the source driver 12 may comprise a plurality of buffers. The buffers are connected to the output channels, and the output channels may be connected to the data lines 15 on a one-to-one basis.

The gate driver 13 may perform normal driving or interlaced low-speed driving of the gate lines 16 based on one or more of the gate timing control signals GDC. The gate driver 13 may generate a scan pulse through a shift register, and supply the scan pulse to the gate lines 16. The shift register of the gate driver 13 may be formed directly on the lower substrate according to a gate driver-in panel (GIP) format.

Figures 5, 6:
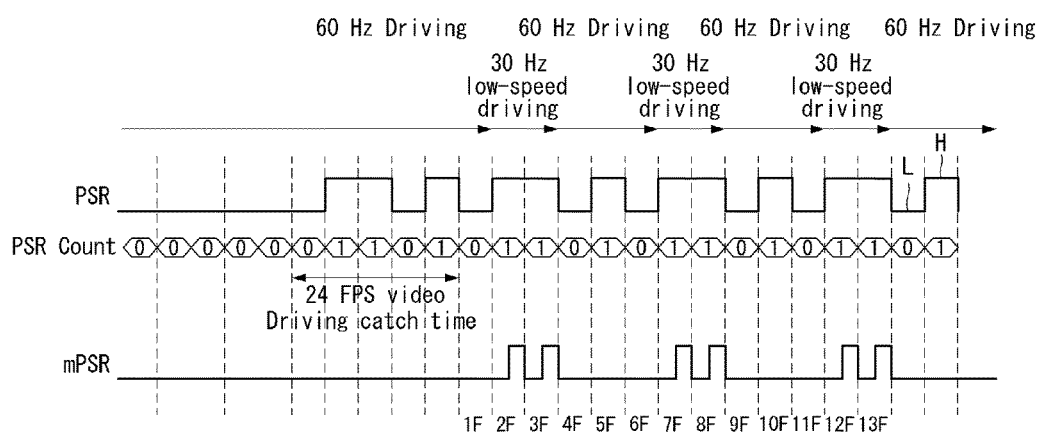
FIGS. 5 and 6 illustrate a concept of combining normal driving and interlaced low-speed driving for a 24 FPS video synchronized with the PSR according to an example embodiment of the present invention.
Figure 7:
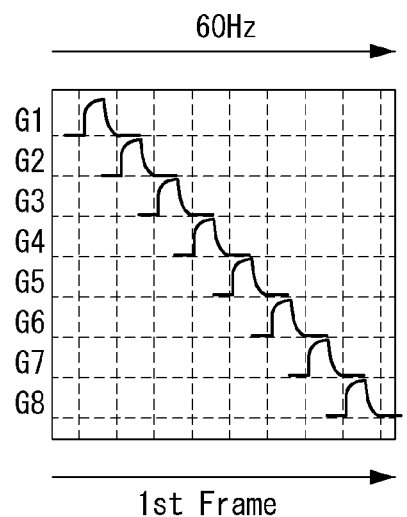
FIG. 7 is a view showing an example of normal driving at 60 Hz.
Figure 8:
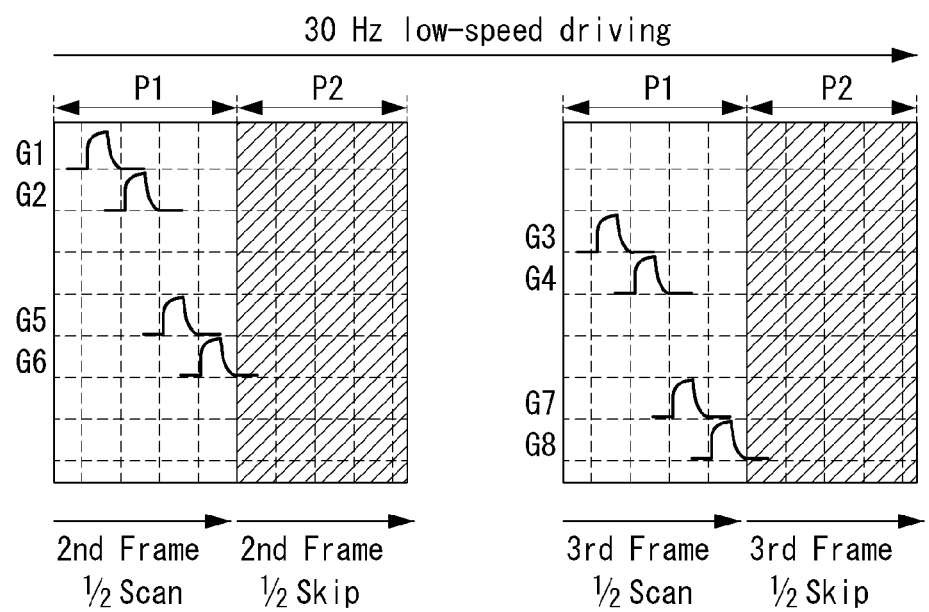
FIG. 8 is a view showing an example of interlaced low-speed driving at 30 Hz.
Figure 9:
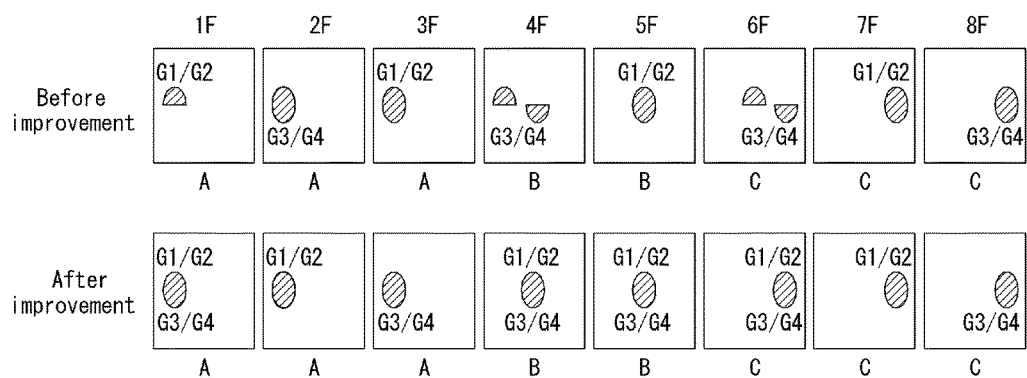
FIG. 9 is a view showing how display distortion may be prevented by applying an example embodiment of the present invention.

FIGS. 5 and 6 illustrate a conceptual example of a combination of normal driving and interlaced low-speed driving for a 24 FPS video synchronized with the PSR according to an example embodiment of the present invention. FIG. 7 illustrates example scan pulses supplied according to a line-sequential method for normal driving at 60 Hz. FIG. 8 illustrates example timing for supplying scan pulses for interlaced low-speed driving at 30 Hz. FIG. 9 illustrates the prevention of display distortion and the resulting improvement in display quality made possible by an example embodiment of the present invention.

As shown in FIGS. 5 and 6, a video data synchronized with the PSR may be set as a 24 FPS (Frame Per Second) image data comprising the first and the second image data (i.e., the first fps and the second fps) that are different from each other. In this example, under the control of the timing controller 11, the source and gate drivers 12 and 13 may perform normal driving of the data lines and gate lines 15 and 16 at 60 Hz in the first frame 1F, for example as shown in FIG. 7, to apply the first image data (the first fps) to the display panel 10. Then, in the second frame 2F, the source and gate drivers 12 and 13 may perform interlaced low-speed driving at 30 Hz, for example as shown in FIG. 8, to apply a part of the first image data (i.e., a part of the first fps data synchronized with the scan pulses written to G1, G2, G5, and G6) to the display panel 10. In the third frame 3F, the source and gate drivers 12 and 13 may perform interlaced low-speed driving at 30 Hz, for example as shown in FIG. 8, to apply the remaining part of the first image data (i.e., the part of the first fps synchronized with the scan pulses written to G3, G4, G7, and G8) to the display panel 10. In the fourth and fifth frames 4F and 5F, the source and gate drivers 12 and 13 may perform normal driving at 60 Hz, for example as shown in FIG. 7, to repeatedly apply the second image data (i.e., the second fps) to the display panel 10.

The data applied to the display panel 10 in the second, the third, and the fifth frames F2, F3, and F5 may be a data that is read out from the frame memory 32 of the timing controller 11 according to the PSR operation. The power to the host system 14 may be cut off in the second, the third, and the fifth frames F2, F3, and F5, thereby reducing power consumption. The use of interlaced low-speed driving (at 30 Hz in this example) in the second and the third frames F2 and F3 can significantly reduce the power consumption in the source driver 12. Although an image data different from that in the preceding third frame F3 is applied in the fourth frame F4 in this example, the display distortion caused by data inconsistency can be prevented by normal driving (at 60 Hz in this example) in the fourth frame F4. Interlaced low-speed driving at 30 Hz may be used for the fifth frame F5, as used, e.g., in the second frame F2. In this case, however, a DC afterimage may occur in some pixels. Therefore, in this example, normal driving at 60 Hz may be more suitable for the fifth frame F5.

Thus, the example embodiment of the present invention can prevent or mitigate display distortion and significantly reduce power consumption, as shown in FIG. 9, by using both normal driving and interlaced low-speed driving for video data synchronized with the PSR.

FIGS. 10A to 10E illustrate various conceptual examples of a combination of normal driving and interlaced low-speed driving for video data synchronized with the PSR. In FIGS. 10A to 10E, "PSR" is the first PSR signal that is applied to the timing controller from the host system, and "mPSR" is the second PSR signal that is generated within the timing controller.

Figure 10A:
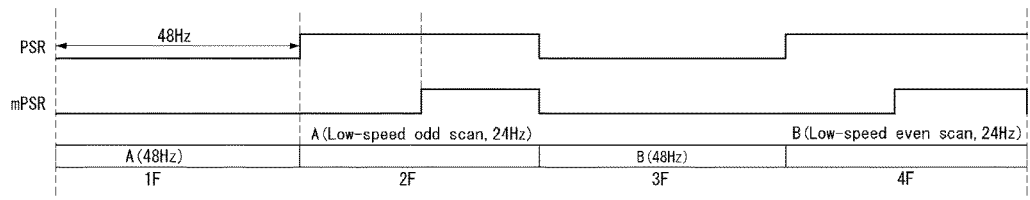
FIGS. 10A to 10E illustrate various examples of combining normal driving and interlaced low-speed driving for an FPS video synchronized with the PSR.

As shown in FIG. 10A, a video data synchronized with the PSR may be set as a 48 FPS (Frame Per Second) image data comprising the first and the second image data A and B different from each other. In this example, under the control of the timing controller 11, the source and gate drivers 12 and 13 may perform: normal driving at 48 Hz for the first frame 1F to apply the first image data A to the display panel 10; interlaced low-speed driving at 24 Hz for a second frame 2F to apply to the display panel a part of the first image data A synchronized with the scan pulses written to G1, G2, G5, and G6 of FIG. 8; normal driving at 48 Hz for the third frame 3F to apply the second image data B to the display panel 10; and interlaced low-speed driving at 24 Hz for the fourth frame F4 to apply to the display panel 10 a part of the second image data B synchronized with the scan pulses written to G3, G4, G7, and G8 of FIG. 8.

Figure 10B:
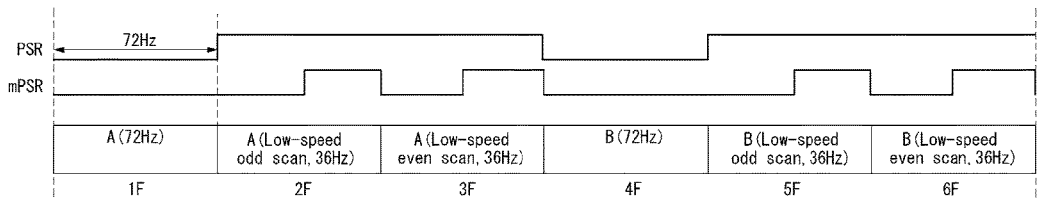

As shown in FIG. 10B, a video data synchronized with the PSR may be set as a 72 FPS (Frame Per Second) image data comprising the first and the second image data A and B different from each other. In this example, under the control of the timing controller 11, the source and gate drivers 12 and 13 may perform: normal driving at 72 Hz for the first frame 1F to apply the first image data A to the display panel 10; interlaced low-speed driving at 36 Hz for the second frame 2F to apply to the display panel 10 a part of the first image data A synchronized with the scan pulses written to G1, G2, G5, and G6 of FIG. 8; interlaced low-speed driving at 36 Hz for the third frame 3F to apply the remaining part of the first data A (i.e., the part of the first image data A synchronized with the scan pulses written to G3, G4, G7, and G8 of FIG. 8) to the display panel 10; normal driving at 72 Hz for the fourth frame 4F to apply the second image data B to the display panel 10; interlaced low-speed driving at 36 Hz for the fifth frame 5F to apply to the display panel a part of the second image data B synchronized with the scan pulses written to G1, G2, G5, and G6 of FIG. 8; and interlaced low-speed driving at 36 Hz for the sixth frame 6F to apply the remaining part of the second data B (i.e., the part of the second image data B synchronized with the scan pulses written to G3, G4, G7, and G8 of FIG. 8) to the display panel 10.

Figure 10C:
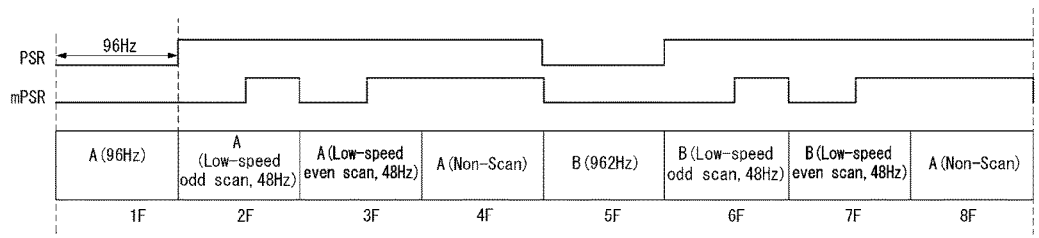

As shown in FIG. 10C, a video data synchronized with the PSR may be set as a 96 FPS (Frame Per Second) image data comprising the first and the second image data A and B different from each other. In this example, under the control of the timing controller 11, the source and gate drivers 12 and 13 may: perform normal driving at 96 Hz for the first frame 1F to apply the first image data A to the display panel 10; perform interlaced low-speed driving at 48 Hz for the second frame 2F to apply to the display panel 10 a part of the first image data A synchronized with the scan pulses written to G1, G2, G5, and G6 of FIG. 8; perform interlaced low-speed driving at 48 Hz for the third frame 3F to apply the remaining part of the first image data A (i.e., the part of the first image data A synchronized with the scan pulses written to G3, G4, G7, and G8 of FIG. 8) to the display panel 10; stop driving for the fourth frame F4; perform normal driving at 96 Hz for the fifth frame 5F to apply the second image data B to the display panel 10; perform interlaced low-speed driving at 48 Hz for the sixth frame 6F to apply to the display panel a part of the second image data B synchronized with the scan pulses written to G1, G2, G5, and G6 of FIG. 8; perform interlaced low-speed driving at 48 Hz for the seventh frame 7F to apply the remaining part of the second image data B (i.e., the part of the second image data B synchronized with the scan pulses written to G3, G4, G7, and G8 of FIG. 8) to the display panel 10; and stop driving for the eighth frame F8. As the gate and source drivers 12 and 13 stop driving for the fourth and the eighth frames F4 and F8, this example may result in a greater reduction in the power consumption.

Figure 10D:
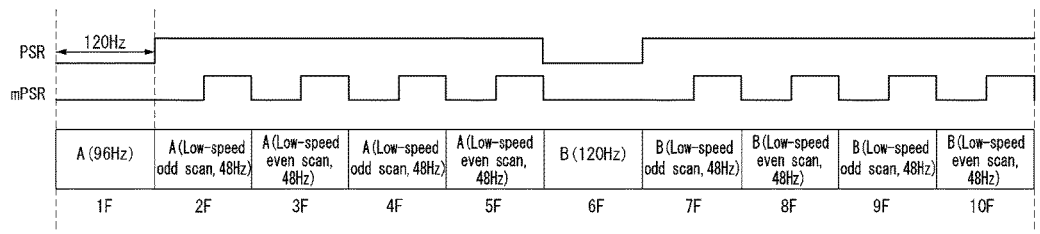

As shown in FIG. 10D, a video data synchronized with the PSR may be set as a 120 FPS (Frame Per Second) image data comprising the first and the second image data A and B different from each other. In this example, under the control of the timing controller 11, the source and gate drivers 12 and 13 may perform: normal driving at 120 Hz for the first frame 1F to apply the first image data A to the display panel 10; interlaced low-speed driving at 60 Hz for each of the second and the fourth frames 2F and 4F to apply repeatedly to the display panel 10 a part of the first image data synchronized with the scan pulses written to G1, G2, G5, and G6 of FIG. 8; interlaced low-speed driving at 60 Hz for each of the third and the fifth frames 3F and 5F to apply the remaining part of the first image data A (i.e., the part of the first image data A synchronized with the scan pulses written to G3, G4, G7, and G8 of FIG. 8) repeatedly to the display panel 10; normal driving at 120 Hz for the sixth frame 6F to apply the second image data B to the display panel 10; interlaced low-speed driving at 60 Hz for each of the seventh and the ninth frames 7F and 9F to apply repeatedly to the display panel 10 a part of the second image data synchronized with the scan pulses written to G1, G2, G5, and G6 of FIG. 8; and interlaced low-speed driving at 60 Hz for each of the eighth and the tenth frames 8F and 10F to apply the remaining part of the second image data B (i.e., the part of the second image data B synchronized with the scan pulses written to G3, G4, G7, and G8 of FIG. 8) repeatedly to the display panel 10.

Figure 10E:
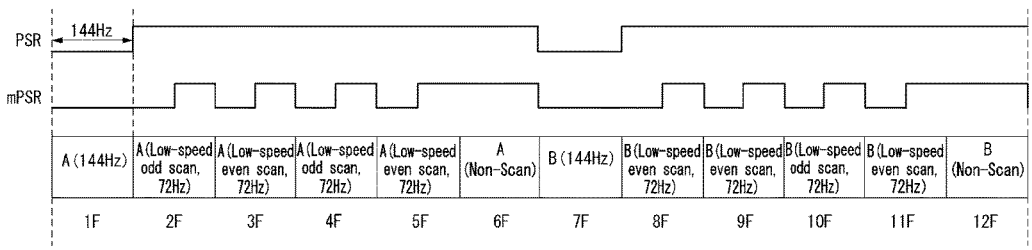

As shown in FIG. 10E, a video data synchronized with the PSR may be set as a 144 FPS (Frame Per Second) image data comprising the first and the second image data A and B different from each other. In this example, under the control of the timing controller 11, the source and gate drivers 12 and 13 may: perform normal driving at 144 Hz for the first frame 1F to apply the first image data A to the display panel 10; perform interlaced low-speed driving at 72 Hz for each of the second and the fourth frames 2F and 4F to apply repeatedly to the display panel 10 a part of the first image data synchronized with the scan pulses written to G1, G2, G5, and G6 of FIG. 8; perform interlaced low-speed driving at 72 Hz for each of the third and the fifth frames 3F and 5F to apply the remaining part of the first image data A (i.e., the part of the first image data A synchronized with the scan pulses written to G3, G4, G7, and G8 of FIG. 8) repeatedly to the display panel 10; stop driving for the sixth frame F6; perform normal driving at 144 Hz for the seventh frame 7F to apply the second image data B to the display panel 10; perform interlaced low-speed driving at 72 Hz for each of the eighth and the tenth frames 8F and 10F to apply repeatedly to the display panel 10 a part of the second image data synchronized with the scan pulses written to G1, G2, G5, and G6 of FIG. 8; perform interlaced low-speed driving at 72 Hz for each of the ninth and the eleventh frames 9F and 11F to apply the remaining part of the second image data (i.e., the part of the second image data B synchronized with the scan pulses written to G3, G4, G7, and G8 of FIG. 8) repeatedly to the display panel 10; and stop driving for the twelfth frame F12. As the source and date drivers 12 and 13 do not perform driving for the sixth and the twelfth frames F6 and F12, this example may result in a greater reduction in the power consumption.

It will be apparent to those skilled in the art that various modifications and variations can be made in the display device capable of low-speed driving and the method of driving the same according to the present invention without departing from the spirit or scope of the invention. Thus, it is intended that the present invention cover the modifications and variations of this invention provided they come within the scope of the appended claims and their equivalents.

What is claimed is:

1. A display device, comprising:
a display panel with a plurality of pixels and a plurality of signal lines respectively connected to the pixels;
a panel driving circuit configured to drive the signal lines; and
a timing controller configured:
to receive a first panel self-refresh (PSR) signal and an input image data from a host system,
to sense whether the input image data has a preset video format based on the first PSR signal, and
if the input image data is sensed to have the preset video format,
to modulate the first PSR signal to generate a second PSR signal, and
to control the panel driving circuit based on the second PSR signal to perform normal driving of the signal lines at a first frame frequency in a first group of frames, in which an image data different from that of a preceding frame is written, and interlaced low-speed driving of the signal lines at a second frame frequency in a second group of frames, in which an image data same as that of a preceding frame is written, to display the input image data,
wherein the preset video format is a 24n frames per second (FPS) image data format, where n is an integer, and
wherein the second frame frequency is lower than the first frame frequency.

2. The display device of claim 1, wherein the timing controller comprises:
a frames per second (FPS) sensing circuit configured to analyze the first PSR signal and to determine whether the input image data has the preset video format;
a PSR modulation circuit configured to modulate the first PSR signal to generate the second PSR signal; and
a control signal generation circuit configured to output timing control signals corresponding to either the normal driving or the interlaced low-speed driving to the panel driving circuit based on the second PSR signal.

3. The display device of claim 2, wherein the timing controller further comprises:
a data receiving circuit configured to receive the input image data from the host system;
a frame memory configured to store the input image data from the data receiving circuit and to output the stored input image data based on the first PSR signal; and
a data output circuit configured to output the input image data from the data receiving circuit or the stored input image data from the frame memory to the panel driving circuit according to either the normal driving or the interlaced low-speed driving based on the second PSR signal.

4. The display device of claim 2, wherein the signal lines include a plurality of gate lines and a plurality of data lines respectively connected to the pixels, wherein the panel driving circuit comprises a gate driver for providing a scan pulse to the gate lines and a source driver for outputting data to the data lines, and wherein, for the interlaced low speed driving during the second group of frames, the control signal generation circuit controls the gate driver to scan some of the gate lines during a scan period in each of the second group of frames, and controls the source driver to cut off the data output to the data lines during a skip period outside the scan period in each of the second group of frames.

5. The display device of claim 4, wherein the source driver includes output buffers for outputting the data to the data lines, and wherein an operating power to the output buffers is cut off during the skip period.

6. The display device of claim 1, wherein the timing controller is further configured to control the panel driving circuit to stop driving the signal lines in a third group of frames.

7. The display device of claim 1, wherein the preset video format is a 24 FPS image data comprising a first image data and a second image data different from each other, and wherein, if the input image data is sensed to have the preset video format, the timing controller is further configured to control the panel driving circuit to perform the normal driving of the signal lines at 60 Hz for a first frame to apply the first image data to the display panel, to perform the interlaced low-speed driving of the signal lines at 30 Hz for a second frame to apply a portion of the first image data to the display panel, to perform the interlaced low-speed driving of the signal lines at 30 Hz for a third frame to apply the remaining portion of the first image data to the display panel, and to perform the normal driving of the signal lines at 60 Hz for each of fourth and fifth frames to repeatedly apply the second image data to the display panel.

8. The display device of claim 1, wherein the preset video format is a 48 FPS image data comprising a first image data and a second image data different from each other, and wherein, if the input image data is sensed to have the preset video format, the timing controller is further configured to control the panel driving circuit to perform the normal driving of the signal lines at 48 Hz for a first frame to apply the first image data to the display panel, to perform the interlaced low-speed driving of the signal lines at 24 Hz for a second frame to apply a portion of the first image data to the display panel, to perform the normal driving of the signal lines at 48 Hz for a third frame to apply the second image data to the display panel, and to perform the interlaced low-speed driving of the signal lines at 24 Hz for a fourth frame to apply a portion of the second image data to the display panel.

9. The display device of claim 1, wherein the preset video format is a 72 FPS image data comprising a first image data and a second image data different from each other, and wherein, if the input image data is sensed to have the preset video format, the timing controller is further configured to control the panel driving circuit to perform the normal driving of the signal lines at 72 Hz for a first frame to apply the first image data to the display panel, to perform the interlaced low-speed driving of the signal lines at 36 Hz for a second frame to apply a portion of the first image data to the display panel, to perform the interlaced low-speed driving of the signal lines at 36 Hz for a third frame to apply the remaining portion of the first image data to the display panel, to perform the normal driving at 72 Hz for a fourth frame to apply the second image data to the display panel, to perform the interlaced low-speed driving of the signal lines at 36 Hz for a fifth frame to apply a portion of the second image data to the display panel, and to perform the interlaced low-speed driving of the signal lines at 36 Hz for a sixth frame to apply the remaining portion of the second image data to the display panel.

10. The display device of claim 1, wherein the preset video format is a 96 FPS image data comprising a first image data and a second image data different from each other, and wherein, if the input image data is sensed to have the preset video format, the timing controller is further configured to control the panel driving circuit to perform the normal driving of the signal lines at 96 Hz for a first frame to apply the first image data to the display panel, to perform the interlaced low-speed driving of the signal lines at 48 Hz for a second frame to apply a portion of the first image data to the display panel, to perform the interlaced low-speed driving of the signal lines at 48 Hz for a third frame to apply the remaining portion of the first image data to the display panel, to stop driving of the signal lines for a fourth frame, to perform the normal driving of the signal lines at 96 Hz for a fifth frame to apply the second image data to the display panel, to perform the interlaced low-speed driving of the signal lines at 48 Hz for a sixth frame to apply a portion of the second image data to the display panel, to perform the interlaced low-speed driving of the signal lines at 48 Hz for a seventh frame to apply the remaining portion of the second image data to the display panel, and to stop driving of the signal lines for an eighth frame.

11. The display device of claim 1, wherein the preset video format is a 120 FPS image data comprising a first image data and a second image data different from each other, and wherein, if the input image data is sensed to have the preset video format, the timing controller is further configured to control the panel driving circuit to perform the normal driving of the signal lines at 120 Hz for a first frame to apply the first image data to the display panel, to perform the interlaced low-speed driving of the signal lines at 60 Hz for each of second and fourth frames to repeatedly apply a portion of the first image data to the display panel, to perform the interlaced low-speed driving of the signal lines at 60 Hz for each of third and fifth frames to repeatedly apply the remaining portion of the first image data to the display panel, to perform the normal driving of the signal lines at 120 Hz for a sixth frame to apply the second image data to the display panel, to perform the interlaced low-speed driving of the signal lines at 60 Hz for each of seventh and ninth frames to repeatedly apply a portion of the second image data to the display panel, and to perform the interlaced low-speed driving of the signal lines at 60 Hz for each of eighth and tenth frames to repeatedly apply the remaining portion of the second image data to the display panel.

12. The display device of claim 1, wherein the preset video format is a 144 FPS image data comprising a first image data and a second image data different from each other, and wherein, if the input image data is sensed to have the preset video format, the timing controller is further configured to control the panel driving circuit to perform the normal driving of the signal lines at 144 Hz for a first frame to apply the first image data to the display panel, to perform the interlaced low-speed driving of the signal lines at 72 Hz for each of second and fourth frames to repeatedly apply a portion of the first image data to the display panel, to perform the interlaced low-speed driving of the signal lines at 72 Hz for each of third and fifth frames to repeatedly apply the remaining portion of the first image data to the display panel, to stop driving of the signal lines for a sixth frame, to perform the normal driving of the signal lines at 144 Hz for a seventh frame to apply the second image data to the display panel, to perform the interlaced low-speed driving of the signal lines at 72 Hz for each of eighth and tenth frames to repeatedly apply a portion of the second image data to the display panel, to perform the interlaced low-speed driving of the signal lines at 72 Hz for each of ninth and eleventh frames to repeatedly apply the remaining portion of the second image data to the display panel, and to stops driving of the signal lines for a twelfth frame.

13. The display device of claim 1, wherein the timing controller is further configured to control the panel driving circuit to perform the normal driving of the signal lines at the first frame frequency if the input image data is sensed not to have the preset video data format.

14. A method of driving a display device, the display device comprising a display panel with a plurality of pixels and a plurality of signal lines respectively connected to the pixels, and a panel driving circuit configured to drive the signal lines, the method comprising:
  receiving a first panel self-refresh (PSR) signal and an input image data from a host system;
  sensing whether the input image data has a preset video format based on the first PSR signal, the preset video format being a 24n frames per second (FPS) image data format, where n is an integer; and
  if the input image data is sensed to have the preset video format,
    modulating the first PSR signal to generate a second PSR signal, and
    controlling the panel driving circuit based on the second PSR signal to perform normal driving of the signal lines at a first frame frequency in a first group of frames, in which an image data different from that of a preceding frame is written, and interlaced low-speed driving of the signal lines at a second frame frequency in a second group of frames in which an image data same as that of a preceding frame is written, to display the input image data,
  wherein the second frame frequency is lower than the first frame frequency.

15. The method of claim 14, wherein the controlling of the panel driving circuit includes:
  modulating the first PSR signal to generate a second PSR signal; and
  outputting timing control signals corresponding to either the normal driving or the interlace low-speed driving to the panel driving circuit based on the second PSR signal.

16. The method of claim 15, wherein the controlling of the panel driving circuit further includes:
  storing the input image data from the host system; and
  outputting the input image data or the stored input image data to the panel driving circuit according to either the normal driving or the interlace low-speed driving based on the first PSR signal and the second PSR signal.

17. The method of claim 15, wherein the signal lines include a plurality of gate lines and a plurality of data lines respectively connected to the pixels,
  wherein the panel driving circuit comprises a gate driver for providing a scan pulse to the gate lines and a source driver for outputting data to the data lines, and
  wherein, for the interlaced low-speed driving during the second group of frames, the outputting of the timing control signals includes:
    outputting at least one gate timing control signal to the gate driver to scan some of the gate lines during a scan period in each of the second group of frames, and
    outputting at least one data timing control signal to the source driver to cut off the data output to the data lines during a skip period outside the scan period in each of the second group of frames.

18. The method of claim 17, wherein the source driver includes output buffers for outputting the data to the data lines, and
  wherein the outputting of the at least one data timing control signal to the source driver includes cutting off an operating power to the output buffers during the skip period.

19. The method of claim 14, wherein the controlling of the panel driving circuit includes stopping driving of the signal lines in a third group of frames.

20. The method of claim 14, further comprising:
  if the input image data is sensed not to have the preset video data format, controlling the panel driving circuit to perform the normal driving of the signal lines at the first frame frequency to display the input image data.

* * * * *